(12) United States Patent
Tasker et al.

(10) Patent No.: US 7,673,021 B2
(45) Date of Patent: Mar. 2, 2010

(54) AUTOMATED PROVISIONING OF PHONES IN PACKET VOICE NETWORKS

(75) Inventors: Michael Tasker, Pleasanton, CA (US); Jawhny Cooke, San Jose, CA (US); Laure Andrieux, San Jose, CA (US); Fong Shen, San Jose, CA (US); Najeeb Farhan Haddad, South San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1257 days.

(21) Appl. No.: 10/778,516

(22) Filed: Feb. 12, 2004

(65) Prior Publication Data

US 2005/0198218 A1  Sep. 8, 2005

(51) Int. Cl.
*G06F 15/177* (2006.01)
(52) U.S. Cl. .................. 709/220; 709/221; 709/222
(58) Field of Classification Search .......... 709/220, 709/221, 222
See application file for complete search history.

(56) References Cited

U.S. PATENT DOCUMENTS

| | | | |
|---|---|---|---|
| 5,930,479 A | 7/1999 | Hall | |
| 6,141,345 A | 10/2000 | Goeddel et al. | |
| 6,185,288 B1 | 2/2001 | Wong | |
| 6,199,099 B1 | 3/2001 | Gershman et al. | |
| 6,226,678 B1 | 5/2001 | Mattaway et al. | |
| 6,243,443 B1 * | 6/2001 | Low et al. | 379/88.17 |
| 6,584,490 B1 | 6/2003 | Schuster et al. | |
| 6,687,245 B2 | 2/2004 | Fangman et al. | |
| 6,744,759 B1 * | 6/2004 | Sidhu et al. | 370/356 |
| 6,757,363 B1 | 6/2004 | Platt et al. | |
| 6,791,970 B1 | 9/2004 | Ng et al. | |
| 6,856,616 B1 * | 2/2005 | Schuster et al. | 370/352 |
| 6,958,992 B2 | 10/2005 | Lee et al. | |
| 7,031,288 B2 * | 4/2006 | Ogier | 370/338 |
| 7,278,028 B1 | 10/2007 | Hingoranee | |
| 2001/0037394 A1 | 11/2001 | Yoshimura et al. | |
| 2002/0064149 A1 | 5/2002 | Elliot et al. | |
| 2002/0131402 A1 * | 9/2002 | Lee et al. | 370/352 |
| 2003/0055912 A1 | 3/2003 | Martin et al. | |
| 2003/0108172 A1 | 6/2003 | Petty et al. | |

(Continued)

OTHER PUBLICATIONS

International Searching Authority, "Notification of Transmittal of the International Search Report of the Declaration," PCT/US05/04268, mailing date Jun. 7, 2005, 7 pages.

(Continued)

*Primary Examiner*—Larry D Donaghue
*Assistant Examiner*—Nicholas Taylor
(74) *Attorney, Agent, or Firm*—Hickman Palermo Truong & Becker LLP

(57) ABSTRACT

Approaches for provisioning phones in packet voice networks are disclosed. One approach provides determining that an Internet Protocol (IP) phone has registered in a network; receiving a unique identifier of the IP phone; determining, based on the unique identifier of the IP phone, a user identifier of an individual user associated with the IP phone; generating a configuration for the IP phone based on the user identifier; and providing the configuration to the IP phone. Various approaches for deriving a user identifier based on the unique identifier of the phone are disclosed.

27 Claims, 7 Drawing Sheets

U.S. PATENT DOCUMENTS

| | | |
|---|---|---|
| 2003/0137991 A1* | 7/2003 | Doshi et al. .................. 370/466 |
| 2003/0217122 A1* | 11/2003 | Roese et al. ................. 709/219 |
| 2003/0223403 A1 | 12/2003 | Higgins |
| 2004/0058710 A1 | 3/2004 | Timmins et al. |
| 2004/0121813 A1 | 6/2004 | Colson et al. |
| 2004/0156490 A1 | 8/2004 | Adams et al. |
| 2004/0260795 A1 | 12/2004 | Gentle et al. |
| 2005/0008136 A1 | 1/2005 | Dobner et al. |
| 2005/0036663 A1 | 2/2005 | Caspi et al. |
| 2009/0154681 A1 | 6/2009 | Kung et al. |

OTHER PUBLICATIONS

Current Claims, PCT/US05/04268, 5 pages.
First Office Action, Chinese Patent Application No. 200580004362.7, dated Sep. 25, 2009, (5 pages) with English translation thereto (2 pages).
Current Claims for CN OA Application No. 200580004362.7, (4 pages).

* cited by examiner

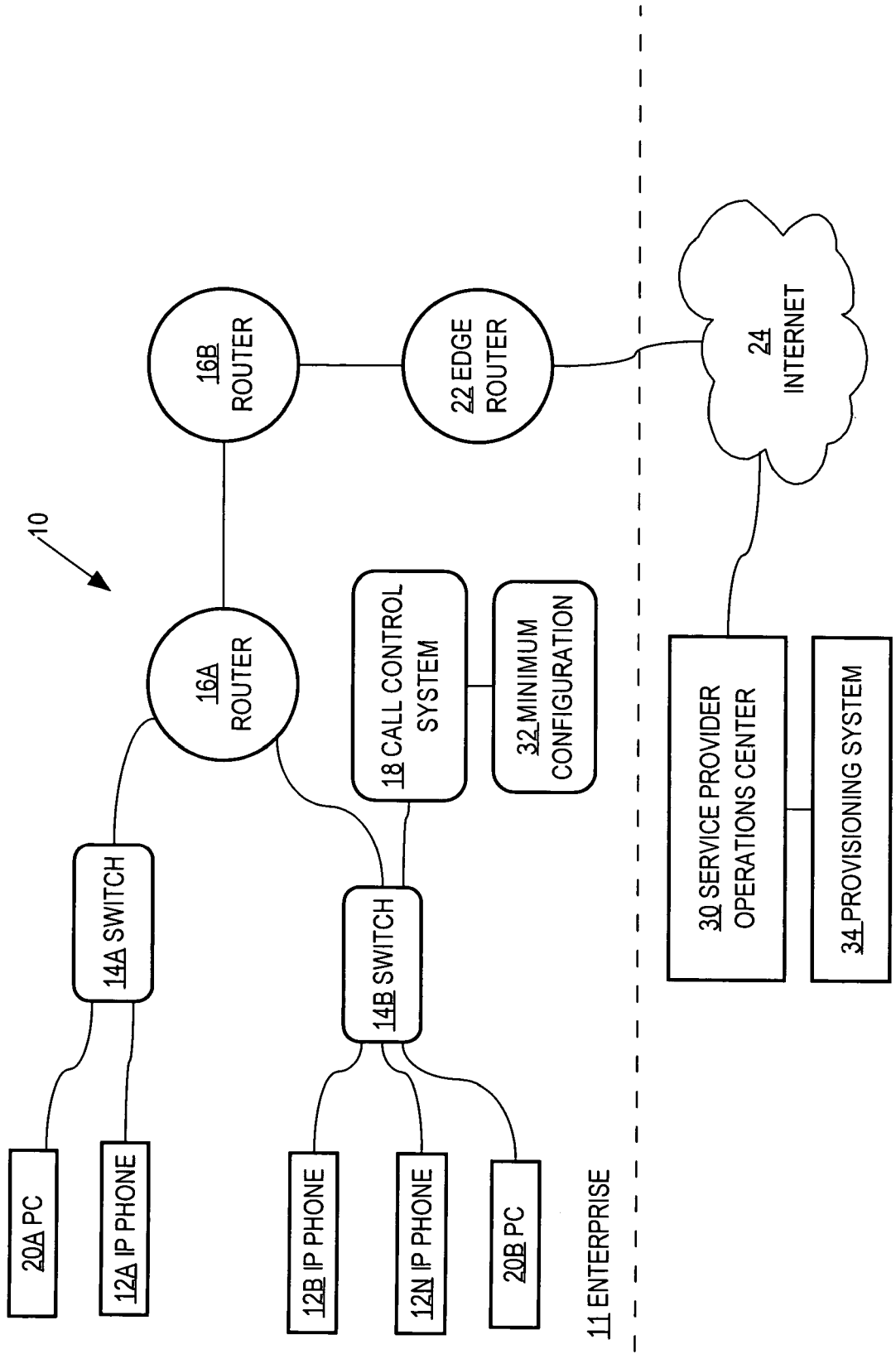

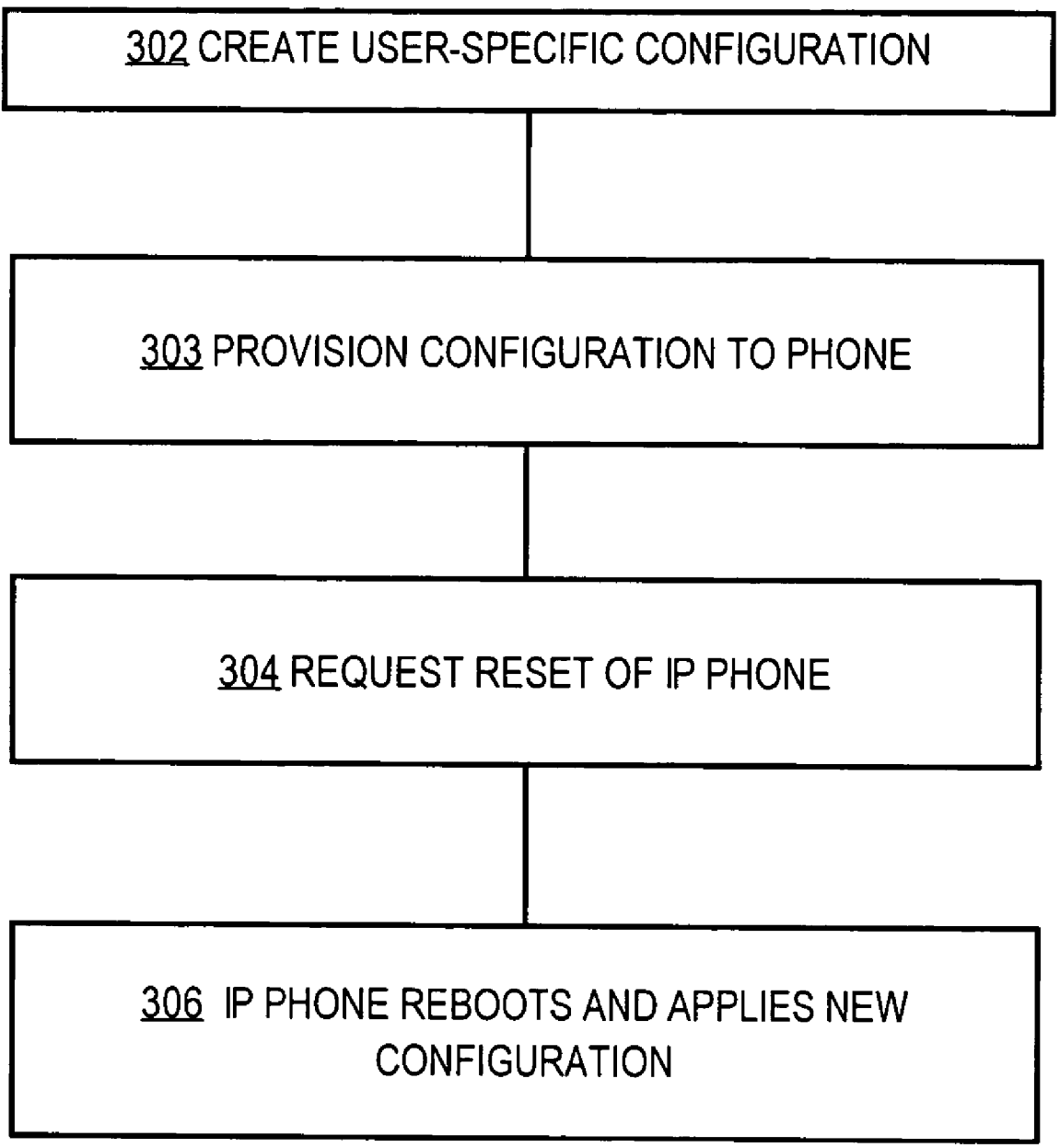

AUTOMATED PROVISIONING OF PHONES IN PACKET VOICE NETWORKS

FIELD OF THE INVENTION

The present invention generally relates to computer networks. The invention more specifically relates to problems involved in provisioning phones that are used in packet voice networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network service providers or customers who use packet voice telephony or voice-over-IP services face challenges in deploying IP phones to end-users. In particular, service providers and customers need to provide an IP phone with a configuration appropriate or correct for each individual user and including a variety of parameters, such as phone numbers and particular feature sets for each phone. For example, an IP phone that is deployed at a reception desk requires an entirely different feature set and configuration than a phone deployed to a conference room. Different individuals also require different phone numbers and/or feature sets depending on the roles of the individuals in an organization.

In a conventional approach, the process of deploying IP phones has been mostly manual. This approach has required a technician to be physically on site to distribute the phones to each location and to create the correct configuration for each phone. This approach is costly and time-consuming. The approach also is especially challenging when migrating an existing customer (or site) to a VoIP network while preserving the customer's existing phone numbers.

Call control systems are used to manage IP phones in VoIP networks. Commercial examples of call control systems include Cisco Call Manager and Call Manager Express on Cisco IOS® routers, commercially available from Cisco Systems, Inc., San Jose, Calif. A call control system identifies a phone by its media access control (MAC) address, which is an identifier value that is assigned when the phone is manufactured and which is typically never changed. Dynamic IP addressing is typically used in VoIP networks, and call control systems typically include or can access a dynamic host control protocol (DHCP) server for assigning addresses.

In this context, when an IP phone boots up, the IP phone obtains an IP address for itself by sending a DHCP request that contains its MAC address to the call control system. The IP phone also requests an initial configuration from the call control system. Upon receiving the initial configuration, the IP phone internally applies the configuration. The IP phone registers with call control with its MAC address and other parameters.

However, the initial configuration typically does not contain all parameter values that are customized or appropriate for a particular individual user. For the IP phone to function properly for a particular user, the correct specific configuration for the IP phone needs to be stored in the call control system in advance, and retrieved and applied to the IP phone. There may be one specific configuration for each MAC address that identifies an IP phone. Therefore, selecting and applying the right configuration requires a way to associate a particular IP phone, as identified by its MAC address, with a particular user. If an individual user can be associated with an individual IP phone, then the right phone numbers and feature sets can be assigned, proper configurations are built and provisioned in the call control for each phone.

In current practice, identifying a phone to user association generally is a manual process. For instance, a service provider sends a technician on site to physically distribute the phones to each location, and that technician determines associations of MAC addresses to users. This information is sent to the network operations center of the service provider, and proper configurations for each phone are manually generated and electronically provisioned in the call control system at the site through network communication. Associations of users to MAC addresses, phone numbers, feature sets, etc. are established. However, this approach is considered too costly and undesirable because it requires an on-site visit and numerous manual steps that are time-consuming and error-prone.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a simplified network topology diagram showing elements in an example packet voice network;

FIG. 3 is a flow diagram of a process for provisioning a phone with a specific configuration;

DETAILED DESCRIPTION

Figure 1B:
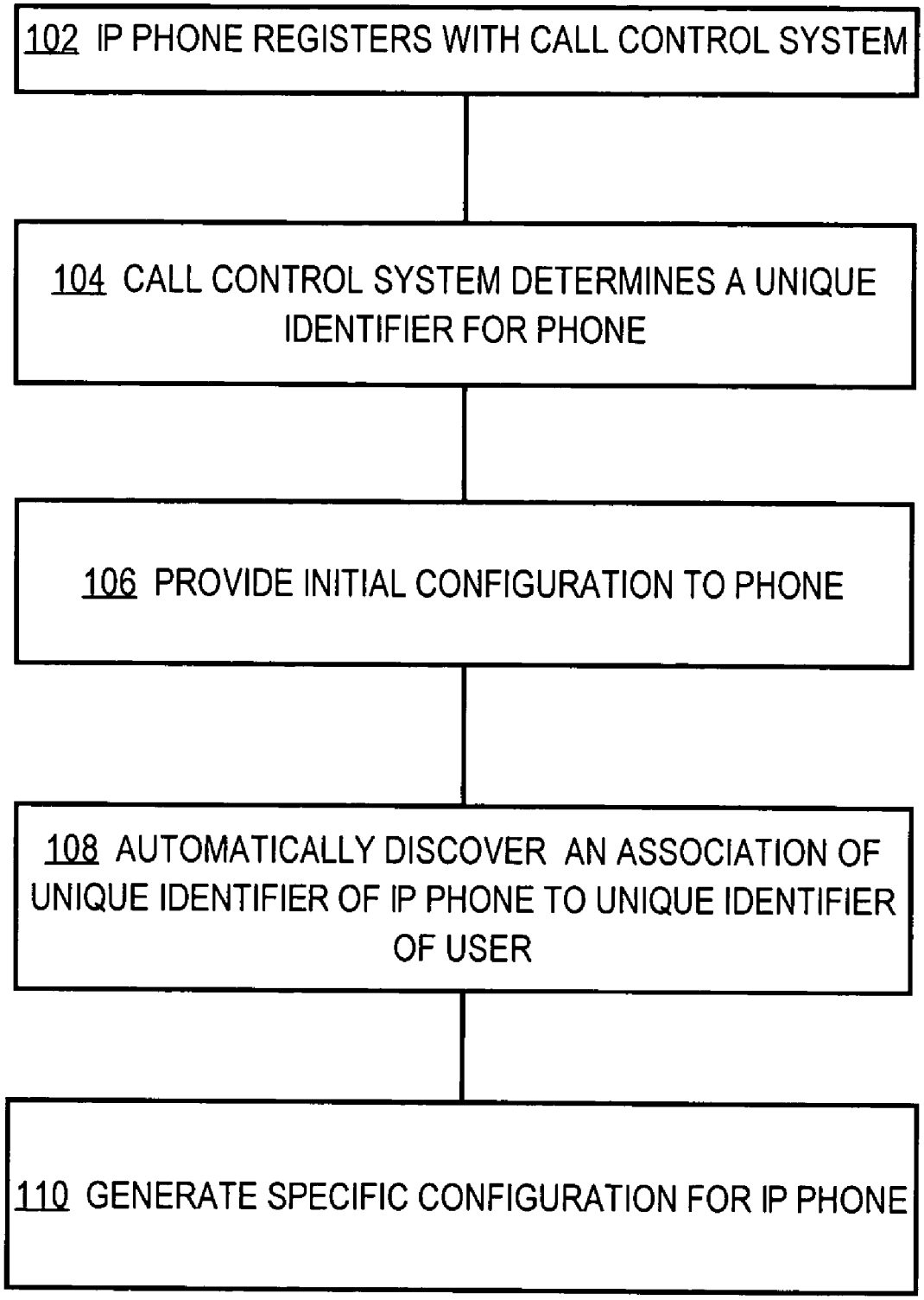
FIG. 1B is a flow diagram showing a high-level view of one approach for automated provisioning of phones in packet voice networks.

An approach for automated provisioning of IP phones in packet voice networks is described. In one approach, phone to user associations are determined automatically, and IP phones are provisioned automatically to facilitate large-scale deployment of IP phones. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Structural and Functional Overview
  3.0 Automated Provisioning of Phones in Packet Voice Networks
    3.1 Determining an Association of Phone Identifier to User Identifier
    3.2 Automatically Provisioning Phone Based on User Identifier
  4.0 Implementation Mechanisms—Hardware Overview
  5.0 Extensions and Alternatives

1.0 General Overview

The needs identified in the foregoing background, and other needs and objects that will become apparent for the following description, are achieved in the present invention, which comprises, approaches for provisioning phones in packet voice networks. One approach comprises determining that an Internet Protocol (IP) phone has registered in a network; receiving a unique identifier of the IP phone; determining, based on the unique identifier of the IP phone, a user identifier of an individual user associated with the IP phone; generating a configuration for the IP phone based on the user identifier; and providing the configuration to the IP phone. Various approaches for deriving a user identifier based on the unique identifier of the phone are disclosed.

According to another approach, provisioning an IP phone in a packet voice network comprises the steps of determining that an Internet Protocol (IP) phone has registered in a network; receiving a media access control (MAC) address of the IP phone; identifying a port of a switch in the network that is coupled to the IP phone; when a mapping of switch ports to user identifiers is unavailable in the network, using a discovery protocol neighbor information to identify another device that is coupled to the same port as the IP phone, and obtaining a user identifier from the discovery protocol neighbor information when such other device is identified; when a mapping of hostnames to user identifiers is unavailable in the network: assigning a unique temporary phone number to the IP phone; monitoring IP traffic passing through the IP phone and directed to the other device; obtaining the user identifier from the IP traffic when the IP traffic comprises packets of a protocol known to include user identifiers; retrieving, from a database of user information, a user record based on the user identifier; obtaining a user phone number from the user record; and provisioning the IP phone with a final configuration that includes the user phone number.

The disclosure provides many other aspects and features of the foregoing aspects. In particular, in other aspects, the invention encompasses a computer apparatus and a computer-readable medium configured to carry out the foregoing steps.

2.0 Structural and Functional Overview

FIG. 1A is a simplified network topology diagram showing elements in an example packet voice network. FIG. 1B is a flow diagram showing a high-level view of one approach for automated provisioning of phones in packet voice networks.

Referring first to FIG. 1A, a packet voice network 10 associated with a business enterprise 11 comprises a plurality of IP phones 12A, 12B, 12N, etc. that are communicatively coupled to ports of one of a plurality of switches 14A, 14B. The switches are coupled to routers 16A, 16B. A call control system 18 is coupled to one of the switches 14A, 14B, or implemented as an application hosted by one of the routers 16A, 16B. In this arrangement, a particular phone 12A is coupled indirectly to the call control system 18 and can register with the call control system.

One or more personal computers 20A, 20B also may be coupled to ports of switches 14A, 14B. In some deployments a particular personal computer may be coupled to the same port of a switch as an IP phone. For example, PC 20A may be coupled to the same port 21 of switch 14A as IP phone 12A. As described further herein, determining whether the MAC address of a device is associated with an IP phone or PC on a particular port may be derived from sources other than information maintained by the switch, such as the phone registration table from Call Control, the CDP neighbor table, where a device type is included.

Network 10 may be coupled to another network such as internet 24 through an edge router and a firewall or other appropriate security control mechanisms. In this arrangement a service provider operation center 30 located outside network 10 and enterprise 11 may communicate with call control system 18 through the internet 24. In the example of FIG. 1A the enterprise 11 may be considered a customer of the service provider. Although the term "service provider" is used in certain descriptions herein, all of the techniques described herein are equally applicable to business enterprises that are deploying packet voice networks independently of a service provider. Thus, the descriptions of the service provider and its interactions with other parties and elements are provided as an example deployment scenario, but the techniques described herein are applicable to an enterprise deployment scenario and others.

Referring now to FIG. 1B, in step 102, an IP phone automatically registers with a call control system. In step 104, the call control system determines a unique identifier associated with the IP phone. In one embodiment, the unique identifier is a MAC address. In step 106, the call control system provides an initial configuration to the IP phone.

In one embodiment, call control system 18 comprises one or more computer programs or other software elements implementing a feature or application that allows phones 12A, 12B, 12N to auto-register with the call control system, and to allow the call control system 18 to discover MAC addresses of the phones. In one embodiment, call control system 18 is coupled to switch 14B and comprises Cisco Call Manager, and in another embodiment call control system 18 is Cisco Call Manager Express in a Cisco IOS® router. The call control system 18 provides the IP phone with a generic minimum configuration 32 that is generated by the call control system based on a template stored in or accessible to the call control system. The minimum configuration 32 includes a phone number that is selected from a pool of available numbers. The pool of available numbers may include private or temporary numbers.

In step 108, a provisioning system automatically discovers, for each IP phone, an association of a unique identifier of the IP phone to a user identifier of an individual user. In one embodiment, operations center 30 includes a provisioning system 34 that auto-discovers associations of phone MAC addresses to users once phones are registered with the minimum configuration. Alternatively, the provisioning system 34 may be implemented as an element of network 10, for example, as part of call control system 18.

In step 110, the provisioning system generates a specific configuration for each phone. In one embodiment, provisioning system 34 generates an IP phone configuration that includes the correct phone number, feature set, and other configuration parameters based on the particular user associated with the phone. In step 112, the provisioning system provides the specific configuration to the call control system. For example, provisioning system 34 communicates a specific configuration to call control system 18 through internet 24. As a result, the call control system 18 can provide the specific configuration to a phone in network 10, and the phone applies and begins using the specific configuration.

Figure 1C:
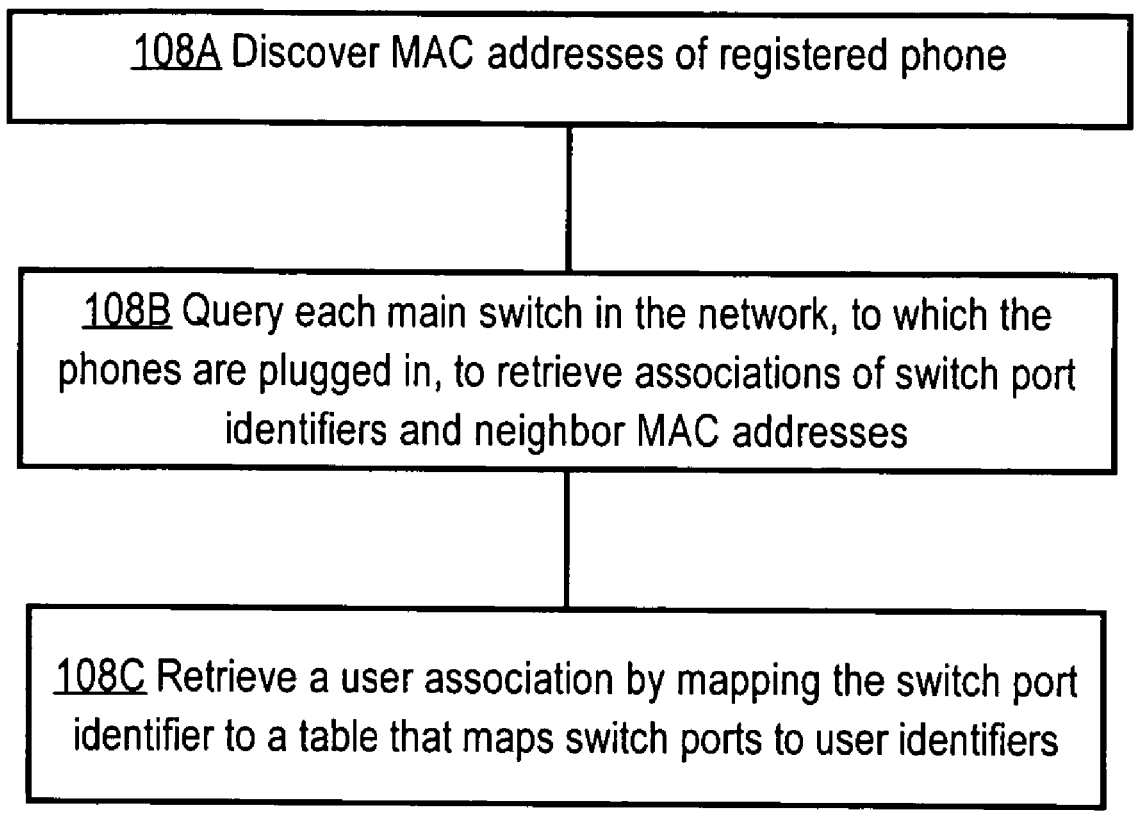
FIG. 1C is a flow diagram of additional steps that may be performed in an implementation of step 108 of FIG. 1B.

FIG. 1C is a flow diagram of additional steps that may be performed in an implementation of step 108 of FIG. 1B. Generally, step 108 involves determining a phone MAC address to user association. In one embodiment, step 108 may involve combining information as shown in FIG. 1C. In step 108A, MAC addresses of registered phones are discovered. In step 108B, a query is issued to each main switch in the network, to which the phones are plugged in, to retrieve associations of switch port identifiers and neighbor MAC addresses. In this context, a neighbor MAC address as maintained by a switch is a MAC address of the device that is coupled to the associated port.

In step 108C, a user association is retrieved by mapping the switch port identifier obtained in step 108B to a table that maps switch ports to user identifiers. It is assumed that each customer maintains information in an inventory tracking system that allows the customer to identify the switch port to user association. Optionally, the inventory tracking system also may provide information about optionally connected devices, locations, etc. Each user may be assigned more than one switch port. If such inventory data is not available, it is required that a site survey be done to provide such information.

Figure 2A:
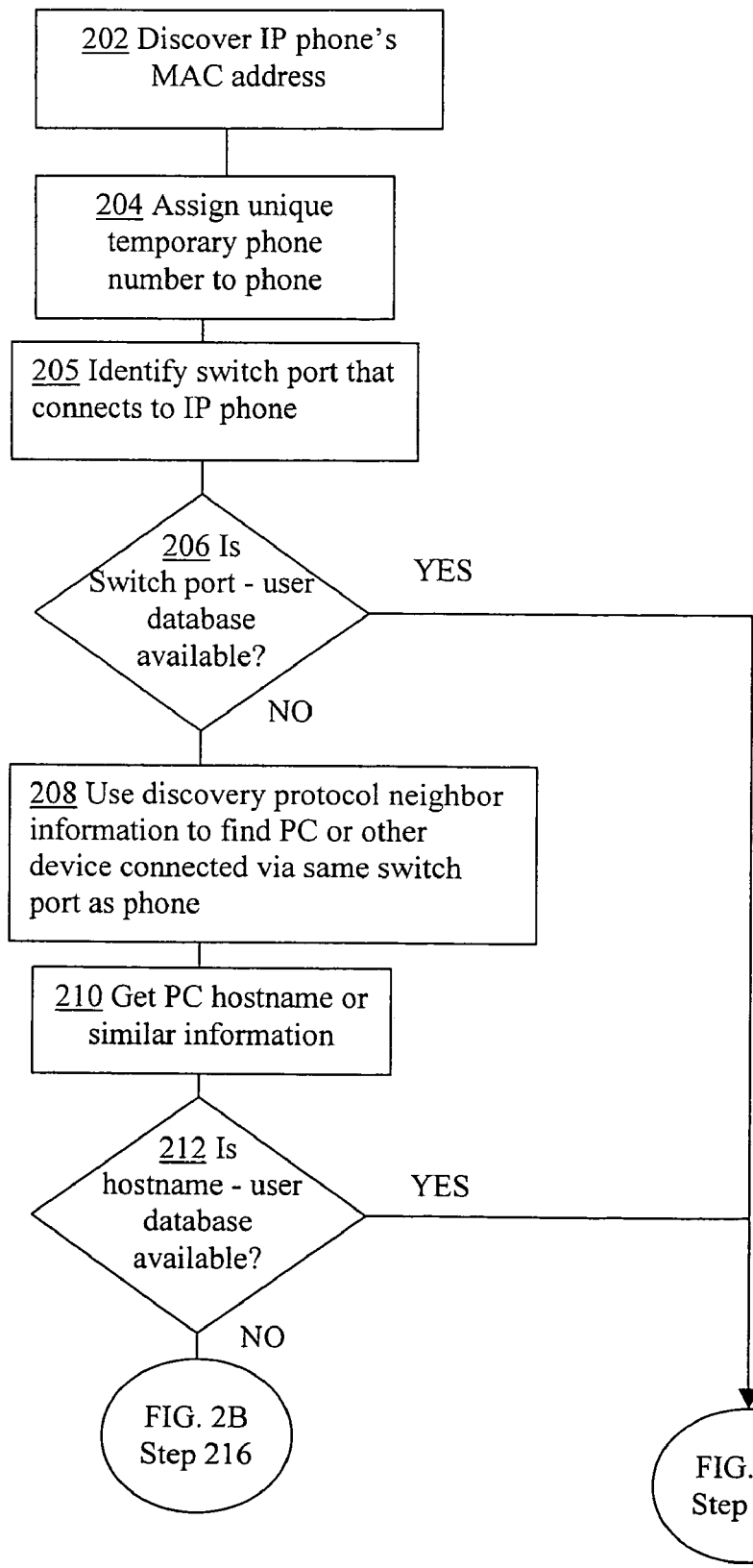
FIG. 2A is a flow diagram of an example embodiment of an approach for automated provisioning of phones in a packet voice network.
Figure 2B:
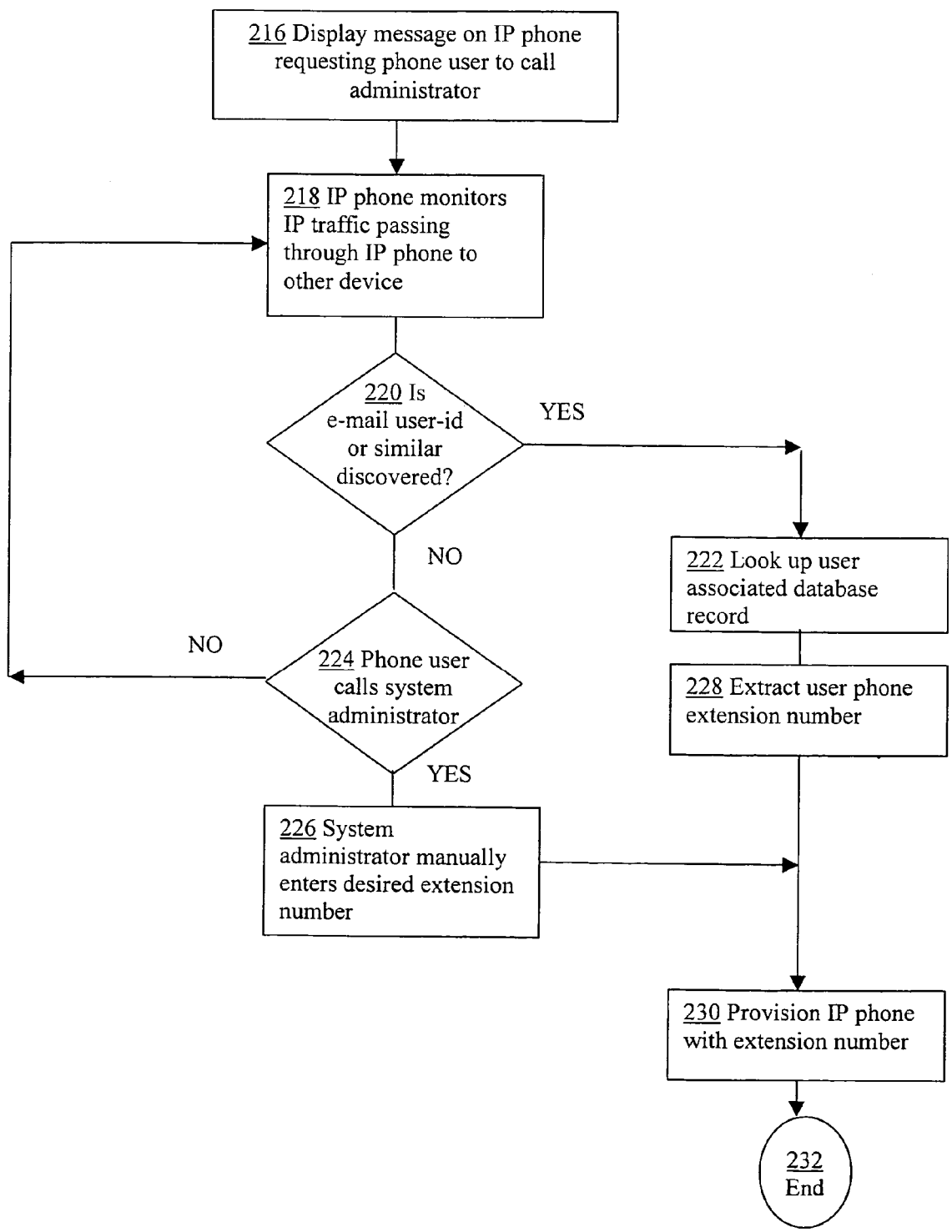
FIG. 2B is a flow diagram of further steps in the approach of FIG. 2A.

3.0 Automated Provisioning of Phones in Packet Voice Networks 3.1 Determining an Association of Phone Identifier to User Identifier A specific embodiment of an approach for automated provisioning of phones in packet voice networks is now described with reference to FIG. 2A, FIG. 2B. FIG. 2A is a flow diagram of an example embodiment of an approach for automated provisioning of phones in a packet voice network, and FIG. 2B is a flow diagram of further steps in the approach of FIG. 2A. In the following description, the term "phone" refers to an IP phone. A commercial example of an IP phone is the Cisco 7920 IP phone, although embodiments may be used with any kind of IP phone.

The description herein of FIG. 2A, FIG. 2B assumes that certain preliminary steps have occurred in the deployment of IP phones. For example, this description assumes that a service provider or customer orders IP phones from a manufacturing organization, which ships the phones directly to the customer site; that is, there is no requirement for a "staging area" or other pre-configuration point at which the IP phones are configured after manufacture but before deployment to the end user site or customer. The service provider also configures the call control system with a minimum configuration for each type of phone or for several types of phones, and a pool of phone numbers to be assigned. The pool comprises temporary numbers that may not correspond to the final numbers that are assigned to the phones on a generally permanent basis.

The description also assumes that the customer opens the shipping box for the phones, distributes the phones to locations in the organization. For example, phones are distributed to employee desks, and each person receives the appropriate type of phone based on a label on the outside of the box. Each person plugs the phone in to a switch port that is typically accessible through a jack at the location of use. The phone then boots up. The IP phone registers with a call control system and provides its MAC address. In response, the call control system provides a minimum configuration with a randomly assigned phone number.

Further, the description herein specifies actions with respect to one IP phone; however, in a commercial embodiment the techniques herein may be applied to any number of IP phones that register and initiate operation relatively concurrently.

Referring now to FIG. 2A, in step 202, the MAC address of the phone is discovered. In one embodiment, such discovery involves listening to a phone registration event published by the call control system, or issuing a query to the call control system for all registered phones. The event or a reply to the query provides a MAC address and a temporary phone number associated with the phone. This approach assumes that the IP phone registers with the call control system and presents, at the time that the phone boots up or registers, a device name that includes the ethernet MAC address. The call control system may maintain a table associating MAC addresses to phone numbers and can generate an event with such information or provide it in a reply to the query.

Optionally, after step 202 is performed, a service provider may require human intervention for the purpose of enforcing security. In particular, there is a risk that an unauthorized IP phone could enter the network, register with the call control system, automatically configure itself as described further herein, and begin placing unauthorized calls through the network, e.g., without the user paying for call service. To increase security, after step 202 the service provider could require an administrator to review the identity of the IP phone and approve it for subsequent processing as described below for steps 204-232. In one embodiment, each time that an IP phone registration event is detected in step 202, the MAC address of the phone and other information from the registration event is stored in a record in a review queue. The process of FIG. 2A is then interrupted until an administrator reviews the record and marks the record as approved. When the record is marked as approved, then control proceeds to step 204.

In step 204 a unique temporary phone number is assigned to the phone. The phone number may be selected from a pool of available temporary numbers.

In step 205, a switch port that connects to the phone is identified. In various embodiments, the switch port that connects to the phone may be determined by establishing a remote connection to the switch and issuing an appropriate query; issuing a DHCP request that encapsulates a request for the switch port under DHCP option 82; interrogating a router ARP table or switch CAM table; and interrogating a discovery protocol table in the switch if supported by the switch.

For example, for Cisco Catalyst® Ethernet switches and IP phones, Cisco Discovery Protocol (CDP) can be enabled to obtain this information. A provisioning system can query the CDP table of the switch, using an SNMP query directed to the Cisco-CDP-MIB to obtain neighboring device information. The cdpCacheTable of Cisco-CDP-MIB gives information about the type of connected device (e.g., router, switch, IP phone), device IP address, device hashKey, and MAC address.

Alternatively, a Layer 2 switch normally maintains a Bridge Forwarding Table (CAM Table) that associates neighbor MAC addresses to port identifiers. In one embodiment, these values may be obtained from the dot1dBasePortIfIndex, dot1dTpFdbTable in the BRIDGE-MIB. Further, for a router or a switch supporting Layer 3 routing, the ARP table of the switch or router contains neighboring device information, including device IP address, MAC address, and connected interface.

Based on any of the foregoing information sources, an association of a phone MAC address to a switch port may be determined by matching the MAC address of a registered phone with a table associating a switch port value and neighbor MAC address that has been obtained from the switch.

Thereafter, an association of the phone MAC address to a user identifier is derived as shown by steps 206 to 228. In step 206, a test is performed to determine if a database or table associating switch port values to user identifier values is available. If so, then a user identifier for the phone can be determined by looking up the port value for the port to which the phone is attached in the database or table; then control is transferred to step 222 of FIG. 2B.

If such a database or table is not available, then indirect means may be used to derive a user identifier, as shown by step 208, step 210, and step 212. In step 208, CDP neighbor information is used to identify a personal computer or other device that is connected to the same switch port as the phone. In step 210, a PC hostname or similar information is retrieved. In step 212, a test is performed to determine whether a database or table that associates hostnames to user identifiers is available. If so, then a user identifier for the phone can be determined by looking up the hostname in the database or table; then control is transferred to step 222 of FIG. 2B.

These steps recognize that a phone to switch port association can be determined based on information about devices other than phones that have a known association to a specific user or location. For example, if a user of an IP phone also has a personal computer (PC), and a customer tracking system maintains information associating an identifier of the PC to a switch port and to a user or location, such information can be used to associate a user to a phone.

As a specific example, in many deployments when a user receives an IP phone, both the phone and PC use the same switch port. The phone can be plugged into the switch port, and the PC is plugged into the switch port built behind the phone. A user identifier can be determined based on interrogating the switch, which sees the MAC address of the PC on the same port as the MAC address of the phone. Some customers may adopt port assignment schemes such as alternating the port number for the IP phone and PC that are deployed at the same location. Therefore, if the customer inventory system already maintains information associating a PC, switch port, and user, then applying an adjacency rule to that information enables deriving an association of the IP phone MAC address, switch port, and user. An example of an adjacency rule is that if a MAC address for an IP phone appears on a switch port having an identifier that is one greater than the port on which the MAC address for a PC appears, then the IP phone is associated with the same user as the PC.

If no database or table is available at step 212, then in step 214 a unique temporary phone number is assigned to the phone. The phone number may be selected from a pool of available temporary numbers. In step 216 a message is displayed on a display of the IP phone requesting the user to contact an administrator. Step 216 is performed because a user identifier has not been located and manual action is necessary to obtain a user identifier in a rapid manner. However, until such time as the user contacts the administrator, the process attempts to use other automated means to identify the user.

In particular, as shown in step 218 of FIG. 2B, in one embodiment the IP phone monitors IP network packets or traffic passing through the IP phone and directed to the PC that is on the same switch port. For example, the IP phone monitors traffic passing through the IP phone to the PC and inspects packets of the traffic to determine if the packets identify well known mail protocols, such as POP3 email access, to discover the email address of the PC user. This step recognizes, for example, that in many deployments a PC is set up to periodically poll its POP3 mail server and retrieve email every few minutes.

In step 220, a test is performed to determine if an email userid or similar identifier is discovered in the traffic through the IP phone. If so, then the email userid is assumed to identify the user of the IP phone, and control passes to step 222.

When step 222 is reached, a user identifier has been determined through one of the preceding methods. Therefore, at step 222, information about the user of the IP phone is retrieved from a database record based on the user identifier. The user information is assumed to include a persistent or permanent user phone extension number, which is extracted at step 228. In step 230, the IP phone is provisioned with the persistent extension number.

If no user identifier is discovered using any of the preceding processes, then at step 224, a test is performed to determine if the phone user has called a system administrator. If not, then control returns to step 218, in which the process continues to monitor traffic through the phone in attempt to identify the user. If the user has called the administrator, then in step 226 the system administrator manually determines a persistent phone number for the IP phone and provides it to the call control system.

Control then passes to step 230 in which the number is provisioned. The process of FIG. 2A-2B ends at step 232.

3.2 Automatically Provisioning Phone Based on User Identifier

FIG. 3 is a flow diagram of a process for provisioning a phone with a specific configuration. FIG. 3 may be performed after determining a user identifier and temporary phone number as in FIG. 2A-2B. In step 302, a provisioning system associated with the call control system creates a user-specific persistent configuration for the IP phone, based on the association of a MAC address, switch port, and user that has been created using the foregoing process. The persistent configuration can include the correct persistent phone number and feature set. In step 303, the persistent configuration is provided to the IP phone. For example, the call control system can provision the new configuration to each IP phone based on the stored MAC address of the phone.

In step 304, the provisioning system requests the call control system to reset the IP phone. In step 306, the IP phone reboots and applies the new configuration. As a result, the full functionality required or appropriate for the IP phone is provided.

Thus, an approach for automated provisioning of IP phones in packet voice networks has been described. In one embodiment, the approach fully automates the IP phone provisioning process and thereby frees service providers or customers from sending a technician on site. The approach eliminates the need for a service provider to provide a phone preparation or staging center, and allows a manufacturing organization to ship phones directly to customers. Therefore, the approach provides cost savings for service providers and their customers.

In an embodiment, the approach allows for deployment scenarios in which the MAC address of the phone cannot be easily obtained. The approach simplifies phone distribution at the customer site and enables personnel to provide the right type of phone to each user based on a packing label on a shipping container for the phone, instead of based on matching a MAC address with a person who owns the phone. The approach reduces disruption of business by ensuring that the same phone numbers are retained when an enterprise migrates from a prior phone system to a VoIP phone system.

3.3 Use of Interactive Voice Response

In an alternative embodiment, an interactive voice response (IVR) system may be used to support configuration of IP phones. In an example implementation, steps 202, 204, and 205 of FIG. 2A are performed. An enterprise that is deploying IP phones creates a list of each employee or other user who is receiving a phone. The list includes an e-mail address of the employee or user. A service provider or enterprise then uses an automatic facility to generate and send an e-mail message to each employee or user. The e-mail includes a pseudo-randomly selected user identifier and password.

Each newly deployed IP phone displays a text message prompting the user to call a specified IVR system number from that phone or any other phone. When the user calls, the IVR uses a calling line identification function ("Caller ID") to determine and collect the calling number, which is the randomly generated phone number that was assigned at step 205. The IVR prompts the user to enter the user identifier and password from the e-mail. Based on the calling number, user identifier and password, a provisioning system interacts with the call control system 18 to reconfigure the call control system with the correct phone number persistently assigned to that user. This process reduces the number of manual steps that an administrator or operator is required to complete deployment and configuration of a new IP phone.

3.4 Deployment in a Cisco Network

As an example embodiment, the preceding general approaches and techniques may be applied in a network that uses Cisco equipment in the following way. Routers 16A, 16B may comprise, for example, the Cisco model 1760, 2611xm, 2621xm, 2651xm, 2691, or 3725 routers. Switches 14A, 14B may comprise Cisco Catalyst 3550-24PWR switches, for example. IP phones 12A, 12B, 12N may comprise Cisco 7910, 7940, 7960, ATA 186, ATA 188, or 7905 IP phones. Other routers, switches and IP phones may be used in other embodiments. The routers, switches and IP phones in network 10 are assumed to be configured to provide packet telephony service with all appropriate support services that are conventionally used to deploy packet telephony. For example, LAN switching, IPsec, IOS(r) Telephony Service, etc., are deployed.

A network associated with the device manufacturer or the service provider is assumed to include a configuration deployment service, such as one or more Cisco CNS Configuration Engine servers. Such servers can automatically deliver configuration information to network elements based on master configurations or templates that are created and approved by the service provider.

The service provider may, but need not, provide external telephone service for the enterprise 11. The service provider (SP) is assumed not to use a staging area on its site, and therefore the Cisco equipment is shipped directly to the customer.

The customer then contacts the SP. The parties define the initial services and the terms of the contract, which may include a service level agreement, schedule, type of IP phone and LAN switch, financial aspects, lease terms, etc.

For each LAN switch, the SP determines the CNS Configuration Engine device to be used, by its hostname or IP address, and identifies the type of CNS identifier value that will be used to uniquely identify the IP phones. The SP calls the manufacturer or uses its Web site and orders the switch and IP phones, specifies appropriate modules, bootstrap configurations, a hostname and network address for a CNS Configuration Engine server and CNS identifier type.

The manufacturer builds the requested devices. Upon shipment, CNS ID values for the switch and the IP phone are communicated to the SP, for example by scanning a bar code of the serial number on the device carton. In an alternative embodiment, the SP may pre-determine the CNS ID values and communicate them to the manufacturer before the devices are built, for use in creating the bootstrap configuration. Further, the CNS Configuration Engine can deliver a configuration for the switch, and an initial configuration for the phones may be provided by the call control system. When Cisco Call Manager is the call control system, then its graphical administration interface may be used to provide the phone configuration. When Cisco Call Manager Express is the call control system, then the CNS Configuration Engine can deliver initial configurations for the phones.

The SP then generates an appropriate initial configuration, including definitions of potential initial services, to be stored on the CNS Configuration Engine, and incremental configurations for enabling initial services when the IP phone begins operating. SP staff also prepares an initial configuration for the switch and finalizes the process in which it enables domain manager and CNS Configuration Engine for the specific platforms. For example, the SP staff may create device images, associate the initial configuration files and CNS Ids, and potentially associate following update steps for following service requests.

The manufacturer then ships the IP phone and switch. Once the customer receives the devices, the customer optionally may call an SP technician to come on site and assist with installation of the IP phone and switch. Alternatively, the customer performs the installation.

The IP phone obtains its IP connectivity through an IP address discovery protocol such as DHCP. The IP phone and switch then can attempt to contact the CNS Configuration Engine that is specified in their bootstrap configurations. If successful, the IP phone and switch retrieve their initial configurations and apply them. The devices then send an event specifying whether configuration success or failure occurred, for example, using the CNS agent.

Upon receiving a success event, the network operations center of the SP automatically or through human intervention sends additional configuration information to the switch or IP phone. Such additional configuration information may include service requests, adjustments, additional services, etc. The preceding processes are then used to discover the network address of the IP phone, determine a user who is associated with the IP phone, and deliver a final configuration to the IP phone.

4.0. Implementation Mechanisms—Hardware Overview

Figure 4:
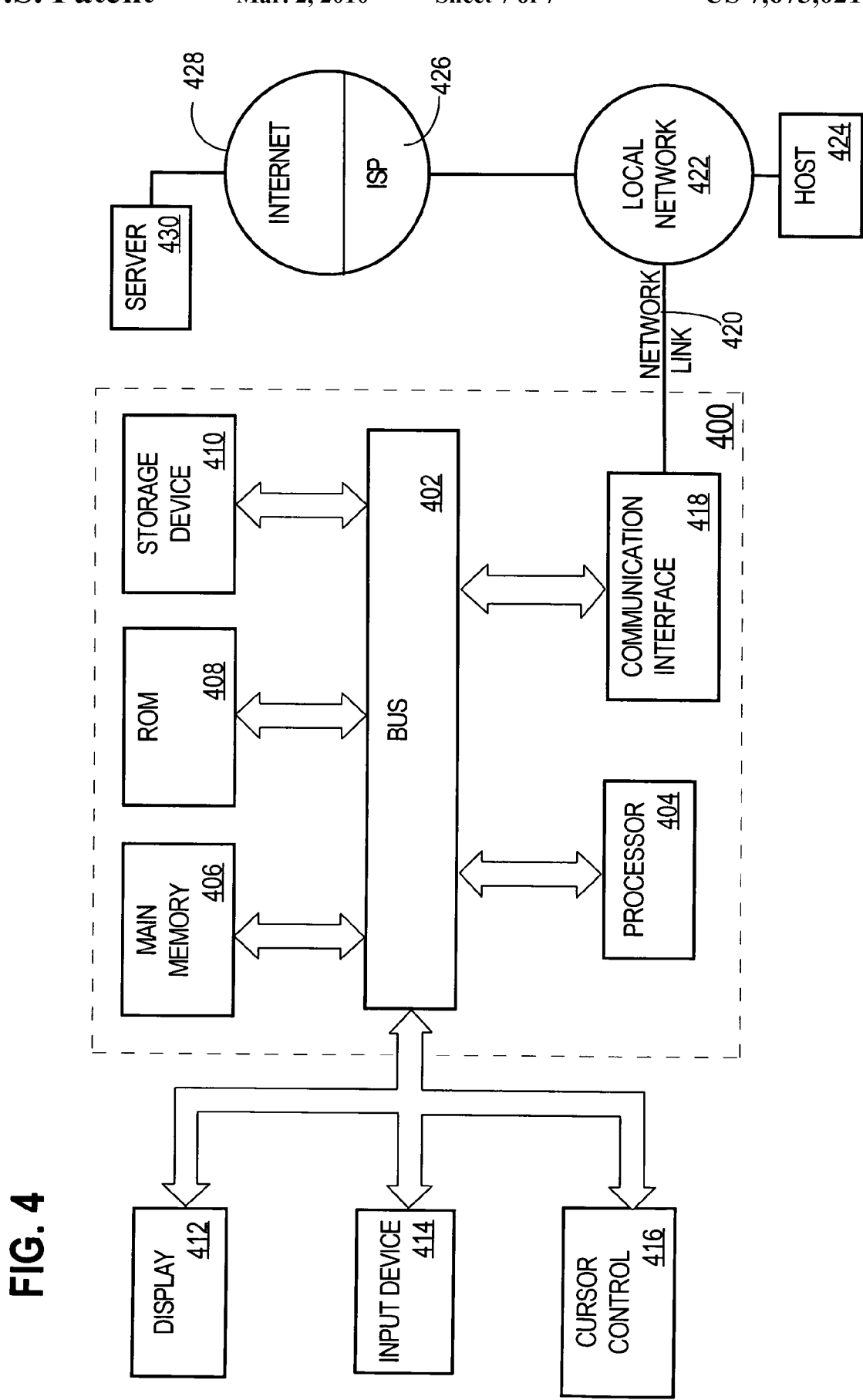
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for automated provisioning of phones in packet voice networks. According to one embodiment of the invention, automated provisioning of phones in packet voice networks is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for automated provisioning of phones in packet voice networks as described herein.

Processor 404 may execute the received code as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising the computer-implemented steps of:

determining that an Internet Protocol (IP) phone having a generic minimal configuration has registered in a network;

receiving a unique identifier of the IP phone;

wherein the unique identifier of the IP phone is a media access control (MAC) address;

determining, based on the unique identifier of the IP phone, a particular user identifier of an individual user associated with the IP phone;

retrieving, based on the particular user identifier, a phone number and a feature set that is associated with the individual user;

selecting a stored basic configuration based on the unique identifier of the IP phone and the particular user identifier;

generating a user specific configuration for the IP phone based on the stored basic configuration and the feature set that is associated with the individual user; and providing the user specific configuration to the IP phone wherein determining the particular user identifier further comprises:

requesting an inventory system to provide a plurality of port identifiers corresponding to each port of each switch in the network and a plurality of neighbor MAC addresses corresponding to each neighbor device that is coupled to each said port;

selecting one of the port identifiers based on matching the unique identifier of the IP phone to the neighbor MAC addresses; and based on the selected port identifier, selecting a user identifier from a table that associates switch ports to users;

wherein the steps are performed by one or more computing devices.

2. A method as recited in claim 1, wherein the unique identifier of the IP phone is a media access control (MAC) address, and wherein the step of determining a particular user identifier further comprises the steps of:

requesting an inventory system to provide a plurality of port identifiers corresponding to each port of each switch in the network, a plurality of neighbor MAC addresses corresponding to each neighbor device that is coupled to each said port, and a plurality of user identifiers that are associated with users of computers that correspond to at least some of the neighbor MAC addresses;

selecting one of the port identifiers based on matching the unique identifier of the IP phone to the neighbor MAC addresses; and selecting one of the user identifiers based on the selected port identifier.

3. A method as recited in claim 1, wherein another device is coupled to the IP phone, and wherein the step of determining a particular user identifier further comprises the steps of:

retrieving, from a network element to which the IP phone and the other device are coupled, discovery protocol neighbor information;

determining from the discovery protocol neighbor information that the other device is coupled to the same network element as the IP phone; and obtaining the user identifier from the discovery protocol neighbor information.

4. A method as recited in claim 1, wherein another device is coupled to the IP phone, and wherein the step of determining a particular user identifier further comprises the steps of:

monitoring network traffic passing through the IP phone and directed to the other device; and obtaining the user identifier from the network traffic when the network traffic comprises packets of a protocol known to include user identifiers.

5. A method as recited in claim 1, wherein the step of determining that an IP phone has registered in a network comprises the steps of subscribing to events identifying registration of IP phones, wherein the events are published by a call controller in the network.

6. A method as recited in claim 1, wherein the step of determining that an IP phone has registered in a network comprises the steps of requesting a call controller in the network to provide information about all IP phones that are known to the call controller.

7. A method as recited in claim 1, wherein the step of determining that an IP phone has registered in a network comprises the steps of requesting a call controller in the network to provide information about all IP phones that are known to the call controller, and wherein the step of receiving a unique identifier of the IP phone comprises receiving, from the call controller, a MAC address of each IP phone that is known to the call controller.

8. A method as recited in claim 1, further comprising the step of provisioning a call controller in the network with the final configuration.

9. A method as recited in any of claims 2, 3, 4, 5, 6, 7, or 8, wherein the call controller comprises a call manager.

10. A method as recited in claim 1, wherein the generic minimal configuration and a temporary number that is assigned from a pool of available numbers are received in a registration by the IP phone.

11. A volatile or non-volatile computer-readable medium storing one or more sequences of instructions, which instructions, when executed by one or more processors, cause the one or more processors to carry out the steps of:

determining that an Internet Protocol (IP) phone having a generic minimal configuration has registered in a network;

receiving a unique identifier of the IP phone;

wherein the unique identifier of the IP phone is a media access control (MAC) address;

determining, based on the unique identifier of the P phone, a particular user identifier of an individual user associated with the IP phone;

retrieving, based on the particular user identifier, a phone number and a feature set that is associated with the individual user;

selecting a stored basic configuration based on the unique identifier of the IP phone and the particular user identifier;

generating a user specific configuration for the IP phone based on the stored basic configuration and the feature set that is associated with the individual user; and providing the user specific configuration to the IP phone wherein determining the particular user identifier further comprises:

requesting an inventory system to provide a plurality of port identifiers corresponding to each port of each switch in the network and a plurality of neighbor MAC addresses corresponding to each neighbor device that is coupled to each said port;

selecting one of the port identifiers based on matching the unique identifier of the IP phone to the neighbor MAC addresses; and based on the selected port identifier, selecting a user identifier from a table that associates switch ports to users.

12. An apparatus, comprising:

means for determining that an Internet Protocol (IP) phone having a generic minimal configuration has registered in a network;

means for receiving a unique identifier of the IP phone;

wherein the unique identifier of the IP phone is a media access control (MAC) address;

means for determining, based on the unique identifier of the IP phone, a particular user identifier of an individual user associated with the IP phone;

wherein determining the particular user identifier further comprises:

means for requesting an inventory system to provide a plurality of port identifiers corresponding to each port of each switch in the network and a plurality of neighbor MAC addresses corresponding to each neighbor device that is coupled to each said port; and means for selecting one of the port identifiers based on matching the unique identifier of the IP phone to the neighbor MAC addresses;

based on the selected port identifier, selecting a user identifier from a table that associates switch ports to users, means for retrieving, based on the particular user identifier, a phone number and a feature set that is associated with the individual user;

means for selecting a stored basic configuration based on the unique identifier of the IP phone and the particular user identifier;

means for generating a user specific configuration for the IP phone based on the stored basic configuration and the feature set that is associated with the individual user; and means for providing the user specific configuration to the IP phone.

13. An apparatus, comprising:
a network interface that is coupled to the data network for receiving one or more packet flows therefrom;
a processor;
one or more stored sequences of instructions which, when executed by the processor, cause the processor to carry out the steps of:
determining that an Internet Protocol (IP) phone having a generic minimal configuration has registered in a network;
receiving a unique identifier of the IP phone;
wherein the unique identifier of the IP phone is a media access control (MAC) address;
determining, based on the unique identifier of the IP phone, a particular user identifier of an individual user associated with the IP phone;
retrieving, based on the particular user identifier, a phone number and a feature set that is associated with the individual user;
selecting a stored basic configuration based on the unique identifier of the IP phone and the particular user identifier;
generating a user specific configuration for the IP phone based on the stored basic configuration and the feature set that is associated with the individual user; and
providing the user specific configuration to the IP phone
wherein determining the particular user identifier further comprises:
requesting an inventory system to provide a plurality of port identifiers corresponding to each port of each switch in the network and a plurality of neighbor MAC addresses corresponding to each neighbor device that is coupled to each said port;
selecting one of the port identifiers based on matching the unique identifier of the IP phone to the neighbor MAC addresses; and
based on the selected port identifier, selecting a user identifier from a table that associates switch ports to users.

14. An apparatus as recited in claim 13, wherein the unique identifier of the IP phone is a media access control (MAC) address, and wherein the instructions for determining a particular user identifier further comprise instructions for:
requesting an inventory system to provide a plurality of port identifiers corresponding to each port of each switch in the network, a plurality of neighbor MAC addresses corresponding to each neighbor device that is coupled to each said port, and a plurality of user identifiers that are associated with users of computers that correspond to at least some of the neighbor MAC addresses;
selecting one of the port identifiers based on matching the unique identifier of the IP phone to the neighbor MAC addresses; and
selecting one of the user identifiers based on the selected port identifier.

15. An apparatus as recited in claim 13, wherein another device is coupled to the IP phone, and wherein the instructions for determining a particular user identifier further comprise instructions for:
retrieving, from a network element to which the IP phone and the other device are coupled, discovery protocol neighbor information;
determining from the discovery protocol neighbor information that the other device is coupled to the same network element as the IP phone; and
obtaining the user identifier from the discovery protocol neighbor information.

16. An apparatus as recited in claim 13, wherein another device is coupled to the IP phone, and wherein the instructions for determining a particular user identifier further comprise instructions for:
monitoring network traffic passing through the IP phone and directed to the other device; and
obtaining the user identifier from the network traffic when the network traffic comprises packets of a protocol known to include user identifiers.

17. An apparatus as recited in claim 13, wherein the instructions for determining that an IP phone has registered in a network comprise instructions for subscribing to events identifying registration of IP phones, wherein the events are published by a call controller in the network.

18. An apparatus as recited in claim 13, wherein the instructions for determining that an IP phone has registered in a network comprise instructions for requesting a call controller in the network to provide information about all IP phones that are known to the call controller.

19. An apparatus as recited in claim 13, wherein the instructions for determining that an IP phone has registered in a network comprise instructions for requesting a call controller in the network to provide information about all IP phones that are known to the call controller, and wherein the instructions for receiving a unique identifier of the IP phone comprise instructions for receiving, from the call controller, a MAC address of each IP phone that is known to the call controller.

20. An apparatus as recited in claim 13, wherein the one or more stored sequences of instructions further comprise instructions which, when executed by the processor, cause the processor to carry out the step of provisioning a call controller in the network with the final configuration.

21. An apparatus as recited in any of claims 14, 15, 16, 17, 18, 19, or 20, wherein the call controller comprises a call manager.

22. An apparatus as recited in claim 13, wherein the generic minimal configuration and a temporary number that is assigned from a pool of available numbers are received in a registration by the IP phone from a call control system.

23. The volatile or non-volatile computer-readable medium of claim 11, wherein the instructions that cause determining a particular user identifier further comprise instructions which when executed cause:
requesting an inventory system to provide a plurality of port identifiers corresponding to each port of each switch in the network, a plurality of neighbor MAC addresses corresponding to each neighbor device that is coupled to each said port, and a plurality of user identifiers that are associated with users of computers that correspond to at least some of the neighbor MAC addresses;
selecting one of the port identifiers based on matching the unique identifier of the IP phone to the neighbor MAC addresses; and selecting one of the user identifiers based on the selected port identifier.

24. The volatile or non-volatile computer-readable medium of claim 11, wherein another device is coupled to the IP phone, and wherein the instructions that cause determining a particular user identifier further comprise instructions which when executed cause:
 retrieving, from a network element to which the IP phone and the other device are coupled, discovery protocol neighbor information;
 determining from the discovery protocol neighbor information that the other device is coupled to the same network element as the IP phone; and
 obtaining the user identifier from the discovery protocol neighbor information.

25. The volatile or non-volatile computer-readable medium of claim 11, wherein another device is coupled to the IP phone, and wherein the instructions that cause determining a particular user identifier further comprise instructions which when executed cause:
 monitoring network traffic passing through the IP phone and directed to the other device; and
 obtaining the user identifier from the network traffic when the network traffic comprises packets of a protocol known to include user identifiers.

26. The apparatus of claim 12, wherein the means for determining a particular user identifier further comprises:
 means for requesting an inventory system to provide a plurality of port identifiers corresponding to each port of each switch in the network, a plurality of neighbor MAC addresses corresponding to each neighbor device that is coupled to each said port, and a plurality of user identifiers that are associated with users of computers that correspond to at least some of the neighbor MAC addresses;
 means for selecting one of the port identifiers based on matching the unique identifier of the IP phone to the neighbor MAC addresses; and
 means for selecting one of the user identifiers based on the selected port identifier.

27. The apparatus of claim 12, wherein another device is coupled to the IP phone, and wherein the means for determining a particular user identifier further comprises:
 means for monitoring network traffic passing through the IP phone and directed to the other device; and
 means for obtaining the user identifier from the network traffic when the network traffic comprises packets of a protocol known to include user identifiers.

* * * * *

UNITED STATES PATENT AND TRADEMARK OFFICE
CERTIFICATE OF CORRECTION

PATENT NO. : 7,673,021 B2  Page 1 of 1
APPLICATION NO. : 10/778516
DATED : March 2, 2010
INVENTOR(S) : Michael Tasker et al.

It is certified that error appears in the above-identified patent and that said Letters Patent is hereby corrected as shown below:

Claim 11, Column 14, line 20, replace "P" with --IP--

Claim 12, Column 14, line 67, replace "," with --.--

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,673,021 B2 |
| APPLICATION NO. | : 10/778516 |
| DATED | : March 2, 2010 |
| INVENTOR(S) | : Tasker et al. |

It is certified that error appears in the above-identified patent and that said Letters Patent is hereby corrected as shown below:

Claim 1, Column 12, line 65, replace "providing the user specific configuration to the IP phone" with --providing the user specific configuration to the IP phone;--

Claim 2, Column 13, line 14, delete "wherein the unique identifier of the IP phone is a media access control (MAC) address, and"

Claim 11, Column 14, line 33, replace "providing the user specific configuration to the IP phone" with --providing the user specific configuration to the IP phone;--

Claim 12, Column 14, line 55, replace "wherein determining the particular user identifier further comprises:" with --wherein means for determining the particular user identifier further comprises:--

Claim 12, Column 14, line 66, replace "based on the selected port identifier, selecting a user identifier" with --means for selecting , based on the selected port identifier, a user identifier--

Claim 13, Column 15, line 37, replace "providing the user specific configuration to the IP phone" with --providing the user specific configuration to the IP phones;--

Claim 14, Column 15, line 51, delete "wherein the unique identifier of the IP phone is a media access control (MAC) address, and"

Signed and Sealed this
Seventeenth Day of May, 2011

David J. Kappos
*Director of the United States Patent and Trademark Office*